Jan. 22, 1952   W. F. WROLSON ET AL   2,583,130
OHM MEASURING INSTRUMENT
Filed Dec. 6, 1947

INVENTORS
WOODROW F. WROLSON
HAROLD OVERDICK
BY *Caswell & Lagaard*
ATTORNEYS

Patented Jan. 22, 1952

2,583,130

UNITED STATES PATENT OFFICE 2,583,130

OHM MEASURING INSTRUMENT

Woodrow F. Wrolson, Minneapolis, and Harold Overdick, Hopkins, Minn.; said Overdick assignor to Jerome Wrolson, Crookston, Minn.

Application December 6, 1947, Serial No. 790,072

7 Claims. (Cl. 175—183)

Our invention relates to ohm measuring instruments and has for an object to provide an instrument by means of which a wide range of measurements may be made without range switching.

An object of the invention resides in providing an instrument utilizing a meter responding to voltage calibrated in ohms in which accurate readings may be taken over the entire scale of the meter.

A still further object of the invention resides in providing an instrument in which a portion of the current ordinarily passing through the resistor whose resistance is to be measured is shunted away from the meter to cause lesser deflection of the pointer of the meter when the resistance of the resistor is low thereby increasing the accuracy of the instrument at the low end of the scale.

Another object of the invention resides in utilizing an electronic valve for shunting said current said valve becoming effective when the voltage drop across said resistor reaches a certain value.

A still further object of the invention resides in providing a circuit including a source of voltage and said resistor and in further providing a circuit shunting said resistor and including an electronic valve and a source of voltage, the voltage of the source in the meter circuit being greater than the voltage of the source in said shunt circuit, and causing operation of said valve when the voltage drop across said resistor reaches a certain value.

An object of the invention resides in utilizing a source of voltage for the meter circuit providing twice the voltage of the source of voltage for the shunt circuit.

A still further object of the invention resides in utilizing as the source of voltage in the shunt circuit a portion of the source of voltage in the meter circuit.

Another object of the invention resides in providing said meter circuit and said shunt circuit with a common portion and in inserting one source of voltage in said common portion and another equal source in the other portion of the meter circuit said sources being disposed in additive relation in said meter circuit.

A still further object of the invention resides in utilizing an electronic tube in said shunt circuit.

An object of the invention resides in providing an instrument which will not be injured by being subjected to an external voltage.

Another object of the invention resides in utilizing said thermionic tube to prevent injury to the instrument upon connection of an external source of direct current to said instrument in a manner to cause the flow of current through the instrument in one direction and in utilizing a similar tube connected in the reverse manner to prevent injury to the instrument upon connection of an external source of direct current to said instrument in a manner to cause the flow of current through the instrument in the opposite direction.

Other objects of the invention reside in the novel combination and arrangement of parts and in the details of construction hereinafter illustrated and/or described.

Figure 1:
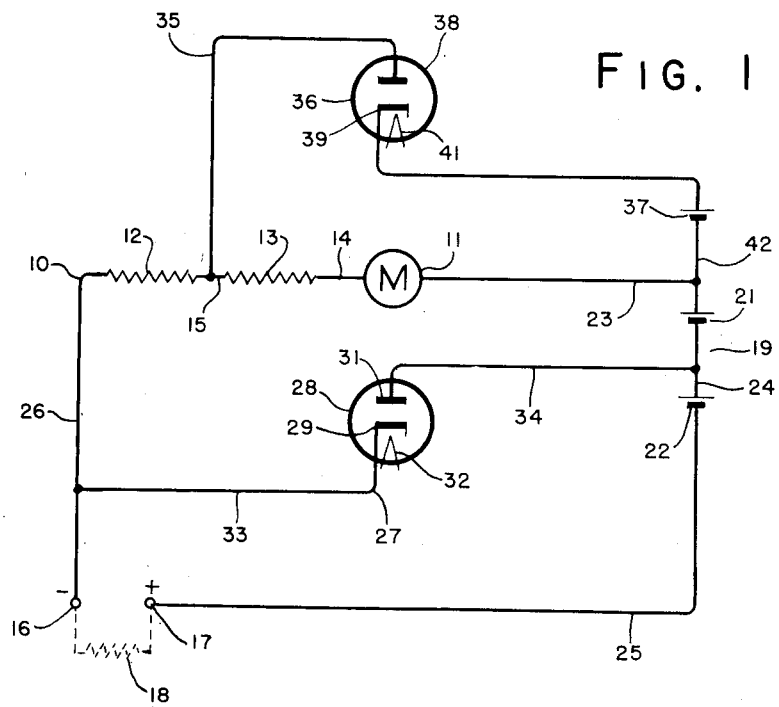
Fig. 1 is a wiring diagram of an instrument for measuring ohms and illustrating an embodiment of our invention.

In the use of the ordinary ohm meter considerable inconvenience and delay results and particularly in the servicing of radio apparatus. In such use an enormous range of resistances must be measured from three or four ohms up to several megohms. The ordinary ohm meter is more accurate than need be near the center of the scale but the graduations at the ends of the scale are exceedingly crowded. It hence becomes necessary to use range switching with the accompanying loss of time and likelihood of error. The present invention overcomes this disadvantage by using a construction whereby spreading of the graduations at the low end of the scale and compressing of the graduations at the center of the scale results.

Our invention comprises a circuit indicated in its entirety by the numeral 10 and which includes a meter 11 and two resistors 12 and 13. The meter 11 may be a foundation movement such as a milliammeter which when connected in series with the resistances 12 and 13 is suitable for measuring voltage. A meter of the D'Arsonval type having a full scale reading of 100 microamperes and a sensitivity of 10,000 ohms per volt may be used. When a meter of such type and sensitivity is used the resistor 12 has a resistance of 15,000 ohms and the resistor 13 has a value such that its resistance added to the resistance of the meter 11 adds up to 15,000 ohms. The meter 11 is connected to the resistor 13 by means of a conductor 14 and said resistor is in turn connected to the resistor 12 by means of a conductor 15.

Figure 3:
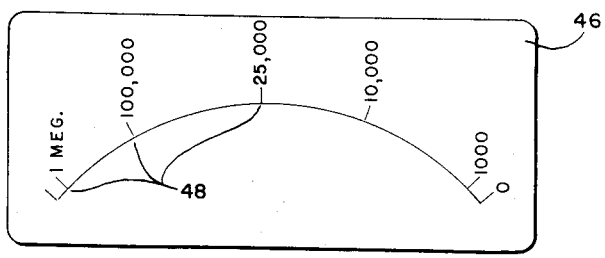
Fig. 3 is a view similar to Fig. 2 of the scale of a conventional ohm meter.

In the circuit 10 is provided two terminals 16 and 17 to which an external resistor may be connected, said terminals may be in the form of binding posts or the same may be the tips of probes or clamps capable of attachment to the various resistors installed in a radio. For the purpose of illustration a resistor 18, has been shown as attached to the terminals 16 and 17. The circuit 10 further includes a composite source of voltage which is indicated in its entirety by the reference numeral 19. This source comprises two separate sources 21 and 22 which are of the same value and which are connected in additive relation. When the instrument is to be used for radio servicing dry batteries are preferably used and single cells of 1.5 volts are employed. This is a safeguard to prevent injury to battery tubes in the event that the instrument is erroneously connected across the filaments of the same. The source of voltage 21 has its positive side connected by means of a conductor 23 to the meter 11. Its negative side is connected by means of a conductor 24 to the positive side of the source of voltage 22. The negative side of this second source of voltage is connected by means of a conductor 25 to the terminal 17 while terminal 16 is connected by means of a conductor 26 to the resistor 12. Due to the fact that the voltage drop across the resistor 18 is dependent upon the relation of the values of the resistance of said resistor and of the resistors 12 and 13 the current passing through the said resistor causes a deflection of the pointer of the meter 11 varying with the resistance of the resistors tested and the scale of the meter can be calibrated to read in ohms the resistance of the various resistors connected to the terminals 16 and 17. The circuit 10 and its components so far described constitutes an ordinary ohm meter having a scale such as indicated in Fig. 3. Such an ohm meter however differs from the conventional in that an extremely sensitive movement has been employed and a two cell battery used which gives suitable spacing of the graduation at the high end of the scale but decided crowding at the low end of the scale and liberal spacing at the center of the scale.

In order to space the graduations at the low end of the scale we employ a shunt circuit 27. This circuit includes a thermionic vacuum tube 28 of the rectifier type. We have found that a 6X5 tube serves the purpose. This is a twin tube and when used in this circuit the corresponding elements are connected in parallel. This tube has a cathode 29, a plate 31 and a heater 32. The cathode 29 is connected by means of a conductor 33 with the conductor 26. The plate 31 is connected by means of a conductor 34 with the conductor 24. The circuit 27 also includes a portion of the circuit 10 namely a part of the conductor 26, resistor 18, conductor 25 the source of voltage 22 and a portion of the conductor 24.

It will readily be comprehended that if an external source of direct current voltage such as the "B" supply of a radio set were unintentionally connected its negative terminal to the terminal 16 that the tube 28 would conduct and thus bypass the current around the meter 11 thus protecting said meter. To protect said meter against accidentally connecting a voltage source with its positive terminal to the terminal 16 a second shunt circuit 35 is employed which includes a vacuum tube 36 and a source of voltage 37 which may be a single dry cell. The tube 36 has a plate 38, a cathode 39 and a heater 41. We have found that a 6H6 tube operates satisfactory. This is a twin tube and when used in this circuit the corresponding elements are connected in parallel. The negative side of source 37 is connected by means of a conductor 42 to the conductor 23 which in turn is connected to the positive side of the source 21. Thus, all three sources are connected in additive relation. The positive side of the source 37 is connected by means of a conductor 42 to the plate 38 of tube 36. A conductor 43 connects the cathode 39 of the said tube to the conductor 15. If a source of direct current is connected with its positive terminal to terminal 16, tube 36 conducts and shunts away a portion of the current which would otherwise pass through the meter 11. Since the invention protects for direct current connected with either polarity at the test leads, protection is likewise had for alternating current voltages.

Figure 2:
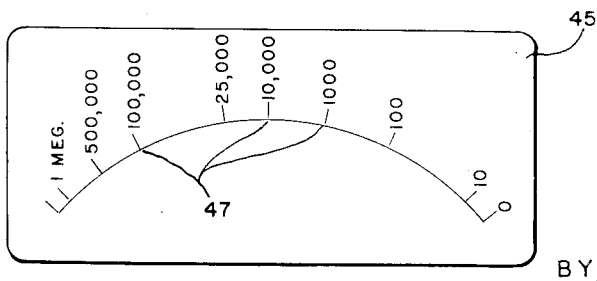
Fig. 2 is a plan view of the scale of the meter used with the instrument disclosed in Fig. 1.

For the purpose of illustrating the advantages of our invention the scales 45 and 46 of two ohm measuring instruments have been shown in Figs. 2 and 3. The scale 45 shown in Fig. 2 is the scale used with the meter 11 of the invention and the scale 46 shown in Fig. 3 is a scale corresponding with the scale 45 and belonging to a conventional ohm measuring instrument. The scale 45 has graduations 47 which range from zero at the right to infinity at the left. Likewise the scale 46 has graduations 48 which cover the same range as the graduations 47. It will be noted, however, that the low value graduations (to the right on an ohm meter) are crowded on the scale 46, from zero to 1000 ohms being confined to about one tenth of an inch along the scale. With applicant's scale, 10 ohms occupy approximately the same space. Thus the scale at the low end is crowded toward the center. No spreading however, occurs at the high end of the scale which is at the left.

The operation of the invention is as follows. A resistor whose resistance is to be measured such as the resistor 18 is placed across the terminals 16 and 17. If this resistance is low a relatively high value of current flows through the same due to the voltage of the source 21 and 22. Part of this current flows through the meter 11, while part of it is bypassed through the tube 28 which serves as a shunt connected across said meter. This reduces the movement of the pointer of the meter 11 and the same takes a position toward the left of the position it would have taken were the tube 28 absent. Thus the graduations at the lower end of the scale become spread apart. When a resistor is placed across the terminals 16 and 17 a voltage drop occurs across the same, which when the resistance of said resistor is small, will not exceed 1½ volts since the voltage applied in the circuit containing the same is three volts. As resistors of high resistance are tested this voltage drop increases and the voltage across the tube 28 decreases and the effectiveness of said tube as a shunt decreases. At the same time the resistance of the tube increases with reduction in voltage across the same so that its effectiveness is still more rapidly reduced as resistors of higher resistance are measured. When the voltage drop across the resistor being tested is 1½ volts the voltage impressed upon the tube 28 becomes zero since the tube is only energized by the source 22, the unidirectional characteristics of the tube preventing any flow through said tube from the source 21. Were it not for the Edison effect in the tube the said tube would with such a resistor drop out as a shunt. However, said tube still continues to conduct to a small degree until when a resistor with relatively high resistance is being tested when the entire current flowing through the same passes through the meter 11. Due to the causes mentioned the effectiveness of the tube 28 is gradually reduced and the portion of the scale at which it is effective gradually merges with the remainder of the scale. With our invention the high range end of the scale which is usually satisfactory is practically unaffected thus retaining the advantages of the convention ohm meter at this end of the scale.

The advantages of the invention are manifest. The instrument is extremely simple to operate in the servicing of radio apparatus, it being merely necessary to connect the terminals 16 and 17 to the resistor to be measured and reading directly the correct resistance. With our invention, but a single scale is employed thus reducing error. By the complete elimination of range switching considerable time is saved in the use of the instrument. With the safety feature of the invention it becomes impossible to damage the meter when the terminals of the instrument are applied to a portion of the radio having direct or alternating current voltage.

Changes in the specific form of our invention, as herein described, may be made within the scope of what is claimed without departing from the spirit of our invention.

Having described our invention, what we claim as new and desire to protect by Letters Patent is:

1. An ohm measuring instrument comprising a circuit including a meter responding to current, a source of current and the resistor whose resistance is to be measured, all connected in series, a circuit shunting said meter and including a source of current and a rectifier in said shunt circuit opposing the flow of current through said shunt circuit from said second source and being adapted to become active when the voltage across said resistor exceeds the voltage of the current source in said shunt circuit.

2. An ohm measuring instrument comprising a circuit including a meter responding to current, a source of current in said circuit disposed on one side of said meter, a second source of current in said circuit connected to said first source and disposed with its voltage in additive relation to the voltage of the first source and the resistor whose resistance is to be measured, and all connected in series, said resistor being connected at one end to said second source, a shunt circuit connected to said first named circuit at a point between said current sources and to the end of said resistor opposite said second current source and a rectifier in said shunt circuit, a second shunt circuit shunting said meter and connected to said meter circuit at the locality of said first current source, a third source of current in said second shunt circuit and a rectifier in said second shunt circuit connected in reverse order as compared to said first named rectifier.

3. An ohm measuring instrument comprising a circuit including a meter responding to current, a source of current in said circuit disposed on one side of said meter, a second source of current in said circuit connected to said first source and disposed with its voltage in additive relation to the voltage of said first source and the resistor whose resistance is to be measured, and all connected in series, said sources of current, having the same voltage, said resistor being connected at one end of said second source, a shunt circuit connected to said first named circuit at a point between said current sources and to the end of said resistor opposite said second current source, and a rectifier in said shunt circuit.

4. An ohm measuring instrument comprising a circuit including a meter responding to current, a source of current in said circuit disposed on one side of said meter, a second source of current in said circuit connected to said first source and disposed with its voltage in additive relation to the voltage of the first source, a resistor disposed on the other side of said meter and the resistor whose resistance is to be measured, and all connected in series, said resistor whose resistance is to be measured being connected at one end to said second source, a shunt circuit connected to said first named circuit at a point between said current sources and at a point between said resistors and a rectifier in said shunt circuit.

5. An ohm measuring instrument comprising a circuit including a meter responsive to current, a source of direct current in said circuit connected with its positive side to said meter, a second source of direct current in said circuit connected with its positive side to the negative side of said first source, said meter, the two sources of current, and the resistor whose resistance is to be measured being all connected in series with one end of the resistor connected to the negative side of said second source, a shunt circuit connected to said first named circuit at a point between said sources of direct current and to said circuit at a point between said resistor and meter and a rectifier in said shunt circuit having a cathode and an anode and arranged with its anode connected to the point between said sources.

6. An ohm measuring instrument comprising a circuit including a meter responding to direct current, a source of direct current and the resistor whose resistance is to be measured, all connected in series in said circuit, a rectifier connected to said circuit and forming therewith a first branch circuit including said rectifier, the meter and said source of direct current and a second branch circuit including said rectifier and the resistor whose resistance is to be measured, said meter being connected in said first branch circuit in a manner such that current from said source flowing in said main circuit causes deflecting of said meter in the proper direction, said rectifier being connected in said first branch circuit in such a manner that current produced by said source will not flow through said rectifier, and a second source of direct current in said second branch circuit, connected in such a manner that the current produced thereby can flow through said rectifier and so that no current flows through either branch circuit or the main circuit when the resistor whose resistance is to be measured is removed from the second branch circuit.

7. An ohm measuring instrument comprising a circuit including a meter responding to direct current, a source of direct current and the resistor whose resistance is to be measured, all connected in series in said circuit, with the positive side of said source of direct current directed toward the positive terminal of the meter, a rectifier connected to said circuit and forming therewith a first branch circuit including said rectifier, the meter and said source of direct current and a second branch circuit including said rectifier and the resistor whose resistance is to be measured, said rectifier being connected in said first branch circuit with its anode directed toward the negative side of said source of current, and a second source of direct current in said second branch circuit connected so that its positive side is directed toward the anode of said rectifier and the negative side of said first named source of current.

WOODROW F. WROLSON.
HAROLD OVERDICK.

REFERENCES CITED

The following references are of record in the file of this patent:

UNITED STATES PATENTS

| Number | Name | Date |
|---|---|---|
| 1,200,796 | Arnold | Oct. 10, 1916 |
| 1,325,889 | Curtis | Dec. 23, 1919 |
| 2,079,485 | Bousman | May 4, 1937 |
| 2,188,588 | Antranikian | Jan. 30, 1940 |
| 2,218,629 | Swart | Oct. 22, 1940 |

FOREIGN PATENTS

| Number | Country | Date |
|---|---|---|
| 578,672 | Great Britain | July 8, 1946 |

OTHER REFERENCES

Wireless World, August 1943, pages 224–227.